(12) United States Patent
Scherl et al.

(10) Patent No.: US 8,684,273 B2
(45) Date of Patent: Apr. 1, 2014

(54) COVER STRUCTURE WITH INTEGRATED CHIP AND ANTENNA

(71) Applicant: Infineon Technologies AG, Neubiberg (DE)

(72) Inventors: Peter Scherl, Regensburg (DE); Frank Pueschner, Kelheim (DE); Juergen Hoegerl, Regensburg (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 13/626,932

(22) Filed: Sep. 26, 2012

(65) Prior Publication Data

US 2013/0075478 A1  Mar. 28, 2013

(30) Foreign Application Priority Data

Sep. 27, 2011   (DE) .......... 10 2011 115 166

(51) Int. Cl.
*G06K 19/06*   (2006.01)
(52) U.S. Cl.
USPC ............ 235/492; 235/435; 235/486; 235/487

(58) Field of Classification Search
USPC .................. 235/435, 486, 487, 492
See application file for complete search history.

(56) References Cited

U.S. PATENT DOCUMENTS

| | | | |
|---|---|---|---|
| 7,059,535 B2 | 6/2006 | Rietzler | |
| 2009/0315320 A1* | 12/2009 | Finn | 283/107 |
| 2010/0051702 A1* | 3/2010 | Paeschke et al. | 235/492 |
| 2010/0295286 A1* | 11/2010 | Goldstein et al. | 281/29 |
| 2011/0002107 A1* | 1/2011 | Tanaka et al. | 361/762 |
| 2011/0102153 A1* | 5/2011 | Rancien | 340/10.1 |
| 2011/0283369 A1* | 11/2011 | Green | 726/30 |

FOREIGN PATENT DOCUMENTS

DE     10338444 A1   6/2005

* cited by examiner

*Primary Examiner* — Kristy A Haupt

(57) ABSTRACT

In various embodiments, a cover structure for a personal identification document is provided. The cover structure may include a cover formed as a single layer; a chip module; the cover having a recess for completely receiving the chip module; and an antenna that is connected to the chip module.

8 Claims, 1 Drawing Sheet

COVER STRUCTURE WITH INTEGRATED CHIP AND ANTENNA

CROSS-REFERENCE TO RELATED APPLICATION

This application claims priority to German patent application Ser. No. 10 2011, 115, 166.8, which was filed Sep. 27, 2011, and is incorporated herein by reference in its entirety.

TECHNICAL FIELD

Various embodiments relate to a cover structure with an integrated chip and an antenna for a personal identification document and to a method for producing a cover.

BACKGROUND

On account of constantly increasing security requirements, there are a variety of efforts to improve existing systems for personal identification or to create new possibilities of identification that make it possible for data specific to a person to be captured more simply and quickly for personal identification. Since there are very differing standards concerning data capture, particularly in the area of personal documents to be carried by people, it has been found to be necessary for advanced systems, such as for example personal identification by transponders, also to be additionally used.

One possibility for realizing such dual identification systems is to provide a conventional identity card with a transponder on which, to coincide with the personal data printed in a secure form in the paper part of the ID, the data are stored in the chip module of the transponder and can be retrieved contactlessly by a suitable reading device. It must at the same time be taken into account here that chip modules are being made smaller and smaller.

DE 103 38 444 A1 discloses a transponder inlay for a personal identification document with an ID page or cover binding, usually referred to in this context as a cover. The transponder inlay has a multilayered structure. A transponder unit consisting of an integrated circuit, also usually referred to as a chip, and an antenna is arranged on a transponder substrate. Two inlay cover layers enclose between them the transponder substrate with the transponder unit.

SUMMARY

In various embodiments, a cover structure for a personal identification document is provided. The cover structure may include a cover formed as a single layer; a chip module; the cover having a recess for completely receiving the chip module; and an antenna that is connected to the chip module.

BRIEF DESCRIPTION OF THE DRAWINGS

Various embodiments of the cover for a personal identification document are explained in more detail below on the basis of the figures, in which.

DESCRIPTION

Figure 1:
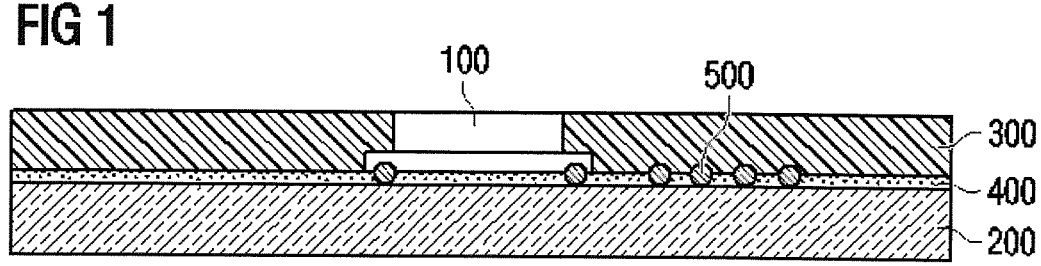
FIG. 1 shows a cover structure.

Exemplary embodiments of the invention are explained in more detail below with reference to the accompanying figures. However, the invention is not restricted to the embodiments actually described, but may be modified and altered in a suitable way. It is within the scope of the invention to combine individual features and combinations of features of one embodiment suitably with features and combinations of features of another embodiment in order to arrive at further embodiments according to the invention.

Before the exemplary embodiments of the present invention are explained below in more detail on the basis of the figures, it is pointed out that the same elements in the figures are provided with the same or similar reference signs and that these elements are not described more than once. Furthermore, the figures are not necessarily to scale. Rather, the prime objective is to explain the basic principle.

Various embodiments provide a cover structure which can be produced at low cost and in which a chip module can be integrated.

The cover structure for a personal identification document includes a cover formed as a single layer and a thin chip module, the cover having a recess for completely receiving the chip module and an antenna that is connected to the chip module. Since both the chip module and the antenna are integrated in the cover, no additional supporting layers are necessary. As a result, thin thicknesses of a cover, which at the same time are very robust, can be realized. Such covers are for example widely used as a cover for passports.

In the case of a cover structure for a personal identification document, the recess may be designed in such a way that the inlaid chip module finishes level with one side of the cover. The fact that the chip module is inlaid in the recess means that the chip module is particularly well protected. This produces a formation that is plane-parallel overall with respect to the surfaces of the cover and makes it possible for example for a further optional, extremely thin binding cover layer to be applied, so that the chip does not stand out on the surface. This increases the robustness even without additional layers being further applied, and consequently increases the service life of the chip module in the cover.

In the case of a cover structure for a personal identification document, an antenna may be arranged on the cover. Antennas on the cover may be applied directly to the cover by means of a printing process, or else coiled antennas may be arranged on the cover. Either way, the application of antennas to the cover can be realized at low cost.

In the case of a cover structure for a personal identification document, the recess may be designed in such a way that it forms a cavity and that the chip module is arranged within the cover. In the case of this arrangement, the chip module is completely surrounded by the material of the cover. This allows the chip module to be protected particularly well from external influences and thereby allows a high degree of robustness, accompanied by a long service life, of the cover with the integrated chip module to be achieved.

In an embodiment of a cover structure for a personal identification document, the antenna may be arranged within the cover. The fact that the antenna is arranged completely, or at least largely, within the cover means that the antenna is protected particularly well from external influences. As a result, a further increase in the robustness, and accompanying extension of the service life, of the cover with the integrated chip module can be achieved.

In an embodiment of a cover for a personal identification document, the cover may include the materials cotton and/or paper. The use of said high-quality materials such as cotton or paper, or else other fabrics or mixtures of paper, possibly with added amounts of plastic, or else the use of pure plastics or synthetic fabrics, allows the cover to be made particularly robust. A long service life of the cover of at least 10 years can be achieved in this way.

In a method for producing a cover for a personal identification document, the antenna and/or the chip is integrally woven and/or pressed into the cover.

The antenna may be formed as a coil with at least one turn. The antenna may be a wire antenna. Other types of antennas, for example produced by printing or etching techniques, are also possible. If the antenna is arranged on the cover, clearances which can at least partially receive the antenna may be formed. One or more clearances may be provided. In an embodiment in which the antenna likewise consists of a coil with at least one turn, the clearance may be located on the upper side of the cover. When there are a number of clearances, they may be arranged in the form of a pattern or imbrication. The clearances may be located inside and outside the antenna coil. The number, size, form and position of the clearance may vary according to the embodiment.

FIG. 1 shows a sectional profile through a transponder inlay 10. The transponder inlay 10 is suitable for use in a personal identification document. Arranged on the cover 200, for example an ID page, is a chip module 100, and an antenna 500. In this embodiment, the cover layer 300 is not closed, but has a window opening in the region of the chip module 100. The chip module 100 is fastened on the cover 200, e.g. a cover body, for example by means of a flip-chip technique. Likewise located on the cover 200 are the connections for the antenna 500. The chip module 100 and the cover layer 300 have been applied to the cover 200 by means of an adhesive layer 400.

Figure 2:
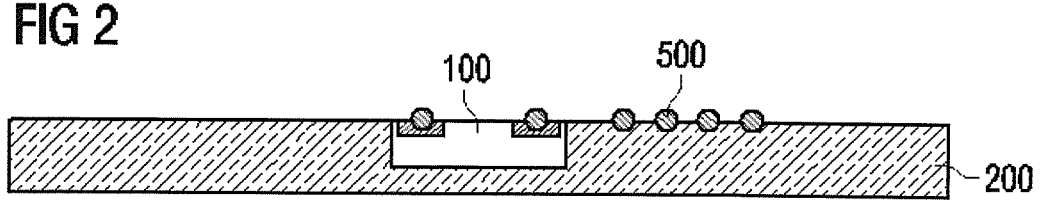
FIG. 2 shows an embodiment of a cover for a personal identification document.

FIG. 2 shows a sectional profile through a first embodiment of a cover 200. In this embodiment, the chip card model 100 is inlaid in a recess of the cover 200. The chip card module may finish flush with the surface of the cover 200. The maximum thickness of the chip card module 100 does not exceed the thickness of the cover. The chip card module 100 is connected to an antenna 500. The antenna 500 is arranged on the surface of the cover 200. The antenna 500 may, however, also be arranged in more or less deeply formed depressions of the cover 200. The chip module 100 may be connected to the cover 200 by means of an adhesive.

Figure 3:
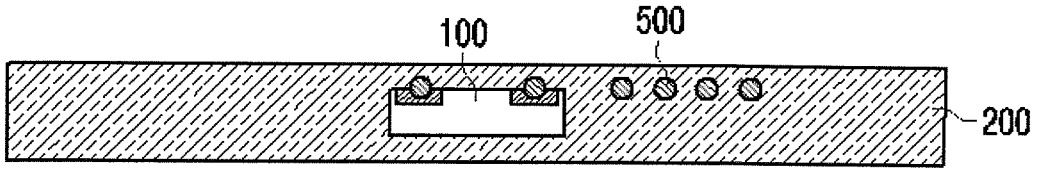
FIG. 3 shows a further embodiment of a cover for a personal identification document.

FIG. 3 shows a sectional profile through a second embodiment of a cover 200. In this embodiment, the chip card module 100 is embedded in a cavity of the cover 200. The chip card module 100 is in this case completely surrounded by the material of the cover. The antenna 500 is likewise embedded in the cover 200 and is completely encapsulated by the material of the cover 200. The material of the cover 200 may include cotton, paper, mixtures of cotton, mixtures of paper, plastics or mixtures of plastic and likewise all conceivable combinations of said materials. The chip card module 100 and/or the antenna 500 may already be integrally woven or pressed into the cover 200 during the production process.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A single layer cover structure for a personal identification document, the cover structure comprising,
   a cover formed as a single layer;
   a chip module;
   the cover having a recess for completely receiving the chip module; and
   an antenna that is connected to the chip module.

2. The single layer cover structure as claimed in claim 1, wherein the recess is configured in such a way that the inlaid chip module finishes level with one side of the cover.

3. The single layer cover structure as claimed in claim 1, wherein the antenna is arranged on the cover.

4. The single layer cover structure as claimed in claim 1, wherein the recess is configured in such a way that it forms a cavity and that the chip module is arranged within the cover.

5. The single layer cover structure as claimed in claim 1, wherein the antenna is arranged within the cover.

6. The single layer cover structure as claimed in claim 1, the cover comprising at least one of the materials cotton and paper.

7. A personal identification document, comprising,
   a single layer cover structure comprising:
     a cover formed as a single layer;
     a chip module;
     the cover having a recess for completely receiving the chip module; and
     an antenna that is connected to the chip module.

8. A method of manufacturing a single layer cover structure for a personal identification document, the single layer cover structure comprising
   a cover formed as a single layer;
   a chip module;
   the cover having a recess for completely receiving the chip module; and
   an antenna that is connected to the chip module;
   the method comprising:
   providing a single layer cover body; and
   at least one of integrally weaving and pressing at least one of the antenna and the chip into the cover body.

* * * * *